United States Patent Office 3,842,003
Patented Oct. 15, 1974

3,842,003
PROCESS FOR REMOVING PROTEINS AND DECOMPOSITION PRODUCTS THEREOF FROM WASTE WATER
Per Nettli, Asker, Norway, assignor to A/S Apothekernes Laboratorium for Specialpraeparator, Oslo, Norway
No Drawing. Filed Mar. 1, 1973, Ser. No. 337,275
Int. Cl. B01d 21/01
U.S. Cl. 210—43          2 Claims

ABSTRACT OF THE DISCLOSURE

Sugar esters of sulphuric acid such as saccharose sulphate, lactose sulphate, amylum sulphate, etc., are useful for the removal of proteins and any decomposition products thereof from waste water by precipitation.

---

The present invention relates to a process for removing proteins and any decomposition products thereof, especially polypeptides and amino acids, from waste water containing such substances, by precipitating the proteins under acidic conditions with organic sulphuric acid derivatives (precipitants), whereby any emulsion of fat and/or oil simultaneously present in the waste water to be purified is broken down, and whereafter the precipitated protein is removed and if desired is further processed, especially into cattle feed.

Effluent containing proteins which may be more or less degraded into polypeptides, amino acids and other nitrogenous substances, is discharged from many industrial plants, and household waste can also contain large quantities of proteins as well as fat or oil. The discharge of this waste into natural receiving streams can be a hazard to the environment, since the waste has a high biological oxygen demand (BOD). It is thus most important to remove proteins and similar substances from the effluent even if this is to be biologically treated, whether by the activated sludge process in a biological filtration plant, or by fermentation by a suitable organism. Furthermore, the proteins in the waste are very valuable since they, among other things can be used for cattle feed and in certain cases can be treated for the recovery of pure amino acids.

It has previously been proposed that lignin sulphonic acid or aromatic sulphonic acids be used to precipitate proteins and similar substances from effluent of this kind, whereby fairly good results have in fact been achieved.

As the purification of effluent achieved in this manner is, however, not complete, it is still desired to achieve a complete or at least more efficient removal of said materials from waste water.

It is thus an object of the present invention to improve a process of the above stated kind in such a manner that a more efficient removal of proteins and any decomposition products thereof from waste water is achieved at equal or even maximally reduced costs.

It has been found that a more efficient removal of proteins from effluent can be achieved by the aid of sugar esters of sulphonic acid having a molar weight of at least approximately 200, than by utilization of lignin sulphonic acids, aryl sulphonate, or aryl sulphonic acid as precipitant.

The object of the present invention is thus a process of the kind stated above that is characterized in that one or more sugar esters of sulphuric acid are used as precipitant, whereby the molar weight of said sugar esters is at least 200.

When a protein-containing effluent is treated according to the present invention, any emulsions of fat and/or oil present are broken down as well, after which the fat or oil can be removed, e.g. by scraping, flotation or centrifugation.

An unusually efficient purification of waste from proteins and/or any decomposition products thereof present is achieved by the process according to the invention, which also has the advantage that the separated proteins or decomposition products thereof are removed in a form that makes them economically utilizable e.g. for cattle feed. The effluent from which proteins etc. have been removed may then be further treated and purified.

In order to ensure an effective, that is, thorough precipitation of the proteins and or decomposition products thereof by the process according to this invention the precipitating agent may be used in excess. After the removal of the precipitated complex of protein and sugar ester of sulphuric acid, the excess of precipitant can be removed by adsorption on chrome tanned leather, preferably used as chips.

The sugar ester or esters of sulphuric acid can be added to the waste water in several ways. It can e.g. simply be thrown into the receptacle containing the waste to be purified. However, the most suitable method is to make a pipe mixture, that is arrange a suitable supply means or mixer in a discharge pipe by which the precipitant is admixed in liquid form, e.g. as an aqueous solution or suspension. A given effluent will normally have a relatively constant composition and especially a relatively constant protein content, and the quantity of precipitating agent required per cubic unit can therefore be calculated on the basis of this composition so that only minor adjustments are necessary. These adjustments can be determined by the turbidity of the waste after the precipitating agent has been added, by the pH or by the flowability of the waste water after the precipitating agent has been added. It is important that sufficient precipitating agent (sugar ester of sulphuric acid) is added to enable all the proteins and/or all decomposition products thereof present to be completely precipitated, whereas excess precipitant as mentioned will cause no harm except to make the process more costly, as the excess can easily be removed.

Precipitation is suitably performed when the pH is between approximately 3 and 4.5, and preferably when it is substantially 3.5. If acid and sugar ester of sulphuric acid are added together, the ratio can be adjusted in advance or the two additives can be mixed to a corresponding ratio, whereupon the supply velocity can be adjusted according to the pH of the mixture of waste and precipitating agent as well as acid. The pH is then constantly established and adjusted in the event of fluctuations, by adjusting the added amount of mixture of acid and precipitant.

EXAMPLES

The sugar esters of sulphuric acid which have been tested according to the invention as regards their ability of precipitating proteins and decomposition products thereof under acidic conditions were produced by careful esterification of various saccharides with 90% sulphuric acid at low temperatures.

In the following examples such esterification products with sulphuric acid of sucrose (saccharose), milk sugar (lactose) and starch (amylum) have been used in comparison with lignin sulphonic acid as a precipitant for proteins in two different qualities of effluent.

(1) To 500 ml. samples of effluent lfrom a pork slaughterhouse were added various amounts of sugar esters in aqueous suspension/solution. In all samples a rapid precipitation occurred with good particle structure, but the resulting clear phase (decantate) differed from sample to sample. By registration of the chemical oxygen demand (COD) of the various decantates the optimal dose of the various sugar esters were determined, as well as for a corresponding series of samples precipitated with lignin sulphonic acid. The pH was adjusted with sulphuric acid in the samples where such adjustment was necessary. In the decantates from the optimally dosed samples the biological oxygen demand, $BOD_7$, and the nitrogen content were determined. Results—

| Precipitant | Dosing ml./l. | $BOD_7$ mg. $O_2$/l. | N org. mg./l. | Percent $BOD_7$ reduction | Percent N reduction |
|---|---|---|---|---|---|
| No precipitation | 0 | 3,800 | 430 | 0 | 0 |
| Sulphated sucrose | 6,400 | 660 | 41 | 82.6 | 90.5 |
| Sulphated milk sugar | 7,200 | 730 | 55 | 80.8 | 87.2 |
| Sulphated starch | 5,600 | 580 | 30 | 84.7 | 93.0 |
| Lignin sulphonic acid | 2,200 | 410 | 102 | 89.2 | 76.2 |

(2) According to the same method as in Example 1 comparative precipitation tests were made with sugar esters and lignin sulphonic acid on effluent from a dairy plant with the following characteristics:

Protein _____ 571 mg./ml.
Carbon hydrates _____ 626 mg./l.
Fat _____ 296 mg./l.
$BOD_7$ _____ 1380 mg. $O_2$/l.

In contrast with Example 1 the precipitated substance was here separated by flotation. Results—

| Precipitant | Dosing ml./l. | $BOD_7$ mg. $O_2$/l. | N org. mg./l. | Percent $BOD_7$ reduction | Percent N reduction |
|---|---|---|---|---|---|
| No precipitation | 0 | 1,380 | 571 | 0 | 0 |
| Sulphated sucrose | 7,000 | 1,060 | 165 | 23.1 | 71.2 |
| Sulphated milk sugar | 7,400 | 990 | 141 | 28.3 | 75.3 |
| Sulphated starch | 6,800 | 830 | 67 | 36.2 | 88.3 |
| Lignin sulphonic acid | 3,200 | 940 | 186 | 31.9 | 67.4 |

The protein rich substances obtained by removal of the precipitated complexes of protein and/or decomposition products thereof and sugar esters of sulphuric acid can be used as cattle feed. They can furthermore, be used in pelleting of other cattle feed since they have adhesive properties and in addition are valuable as food in themselves. They can also be used as an adhesive, e.g. in the production of plywood and chipboard and are not only cheaper but also adhere more strongly than ordinary protein glues.

When used as feed it may be expedient to adjust the pH of the product to approximately 6–8, e.g. by means of ammonia. After the pH is adjusted the product is usually dried, preferably in a drum dryer, by atomization, since the particle size obtained is most favourable.

What is claimed is:

1. In a process for removing proteins and any decomposition products thereof, especially polypeptides and amino acids, from waste water containing such substances by precipitating the proteins under acidic conditions with an organic sulphuric acid derivative as a precipitant whereby any emulsion of fat and/or oil present in the waste water to be purified is broken down, and whereafter the precipitated product is removed and if desired can be further processed, especially into cattle feed, the improvement comprising precipitating said proteins and decomposition products thereof from said waste water with a precipitating agent comprising at least one esterification product of a sugar with sulphuric acid, said esterification product having a molar weight of at least 200.

2. A process according to claim 1, wherein said esterification product is selected from the group consisting of saccharose sulphate, lactose sulphate, and amylum sulphate.

References Cited

UNITED STATES PATENTS 3,075,965  1/1963  Tovey et al. _____ 260—234 R

FOREIGN PATENTS 887,899  12/1971  Canada _____ 210—54

FRANK A. SPEAR, Jr., Primary Examiner

P. A. HRUSKOCI, Assistant Examiner

U.S. Cl. X.R.

210—45, 54